United States Patent
Nakase

(10) Patent No.: US 10,410,674 B2
(45) Date of Patent: Sep. 10, 2019

(54) IMAGING APPARATUS AND CONTROL METHOD FOR COMBINING RELATED VIDEO IMAGES WITH DIFFERENT FRAME RATES

(71) Applicant: CANON KABUSHIKI KAISHA, Tokyo (JP)

(72) Inventor: Yuichi Nakase, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 14/970,721

(22) Filed: Dec. 16, 2015

(65) Prior Publication Data

US 2016/0189747 A1 Jun. 30, 2016

(30) Foreign Application Priority Data

Dec. 25, 2014 (JP) ................................ 2014-263351

(51) Int. Cl.
*G11B 27/034* (2006.01)
*H04N 5/232* (2006.01)
(Continued)

(52) U.S. Cl.
CPC ....... *G11B 27/034* (2013.01); *H04N 5/23245* (2013.01); *H04N 5/772* (2013.01);
(Continued)

(58) Field of Classification Search
CPC ... G11B 27/034; G11B 27/036; G11B 27/031; H04N 5/23245; H04N 5/772;
(Continued)

(56) References Cited

U.S. PATENT DOCUMENTS 5,625,412 A * 4/1997 Aciu ..................... H04N 5/2251
348/222.1
5,754,248 A * 5/1998 Faroudja .............. H04N 7/0112
348/429.1
(Continued)

FOREIGN PATENT DOCUMENTS

JP 2003-153054 A 5/2003
JP 2004-222236 A 8/2004
(Continued)

OTHER PUBLICATIONS

Machine generated translation of DE102014102689.6, Feb. 28, 2014.*
(Continued)

*Primary Examiner* — David E Harvey
(74) *Attorney, Agent, or Firm* — Cowan, Liebowitz & Latman, P.C.

(57) ABSTRACT

An imaging apparatus comprises an imaging unit, a recording unit configured to record a piece of moving image data, a setting unit configured to set a frame rate of a piece of moving image data, a selection unit configured to select a piece of moving image data to be edited from among a plurality of pieces of moving image data, and a generation unit configured to generate a piece of moving image data having a first frame rate by combining pieces of moving image data, wherein the selection unit sets, as the first frame rate, a frame rate that has been set by the setting unit, and selects, as the piece of moving image data to be edited, a piece of moving image data having a second frame rate that is related to the first frame rate.

12 Claims, 4 Drawing Sheets

(51) Int. Cl.
*H04N 5/77* (2006.01)
*H04N 5/783* (2006.01)
*H04N 9/804* (2006.01)
*H04N 9/806* (2006.01)
*H04N 9/82* (2006.01)

(52) U.S. Cl.
CPC ............. *H04N 5/783* (2013.01); *H04N 9/806* (2013.01); *H04N 9/8042* (2013.01); *H04N 9/8227* (2013.01)

(58) Field of Classification Search
CPC ...... H04N 5/783; H04N 9/8042; H04N 9/806; H04N 9/8227
USPC ......................................................... 386/278
See application file for complete search history.

(56) References Cited

U.S. PATENT DOCUMENTS

| | | | | |
|---|---|---|---|---|
| 7,206,025 B2* | 4/2007 | Choi | ...................... | G09G 5/006 348/441 |
| 7,652,797 B2* | 1/2010 | Imamura | ............... | G06F 16/739 358/296 |
| 7,991,803 B2* | 8/2011 | Mercer | ............. | G06F 17/30056 707/769 |
| 8,346,053 B2* | 1/2013 | Fujihata | ............... | G11B 27/031 386/210 |
| 8,718,448 B2* | 5/2014 | Lin | ...................... | G11B 27/005 348/222.1 |
| 8,839,110 B2* | 9/2014 | Wang | ................... | G11B 27/034 715/723 |
| 2003/0219238 A1* | 11/2003 | Yamaguchi | .............. | H04N 5/46 386/224 |
| 2004/0071211 A1* | 4/2004 | Washino | .............. | G11B 27/034 375/240.01 |
| 2004/0143679 A1* | 7/2004 | Ogikubo | ................ | G11B 20/10 709/247 |
| 2004/0252241 A1* | 12/2004 | Paulsen | .................. | H04N 5/268 348/722 |
| 2006/0008247 A1* | 1/2006 | Minami | ............... | G11B 27/034 386/280 |
| 2006/0253857 A1* | 11/2006 | Wu | ....................... | G11B 27/034 718/105 |
| 2007/0047918 A1* | 3/2007 | Park | ..................... | G11B 27/032 386/224 |
| 2007/0242139 A1* | 10/2007 | Horita | .................... | H04N 5/772 348/231.99 |
| 2008/0148152 A1* | 6/2008 | Blinnikka | ........... | G06F 3/04817 715/719 |
| 2009/0046175 A1* | 2/2009 | Ozawa | ................... | H04N 5/772 348/231.99 |
| 2009/0136145 A1* | 5/2009 | Morimoto | ............ | G11B 27/034 382/233 |
| 2009/0147131 A1* | 6/2009 | Mikawa | ................. | G11B 27/34 348/445 |
| 2009/0263103 A1* | 10/2009 | Mae | ...................... | G11B 27/105 386/248 |
| 2010/0053345 A1* | 3/2010 | Kim | ....................... | H04N 5/232 348/208.4 |
| 2010/0091113 A1* | 4/2010 | Morioka | ................ | H04N 5/147 348/207.1 |
| 2011/0206352 A1* | 8/2011 | Mikawa | ............... | G11B 27/034 386/284 |
| 2012/0177346 A1* | 7/2012 | Kuriyama | .............. | H04N 5/772 386/286 |
| 2012/0210232 A1* | 8/2012 | Wang | ................... | G11B 27/034 715/723 |
| 2012/0224145 A1* | 9/2012 | Goodhill | ................ | G03B 21/00 352/40 |
| 2014/0294320 A1* | 10/2014 | Kokaram | .............. | H04N 7/0127 382/275 |
| 2015/0062427 A1* | 3/2015 | Thomson | ............ | H04N 7/0127 348/459 |
| 2015/0249775 A1* | 9/2015 | Jacumet | ............... | H04N 5/2251 348/333.11 |
| 2015/0279429 A1* | 10/2015 | Laksono | .................. | H04N 5/93 386/241 |

FOREIGN PATENT DOCUMENTS

| | | | |
|---|---|---|---|
| JP | 2008301451 A | * | 12/2008 |
| JP | 2011-009970 A | | 1/2011 |
| JP | 2011-172110 A | | 9/2011 |
| JP | 2013219589 A | * | 10/2013 |

OTHER PUBLICATIONS

The above foreign patent documents were cited in the Sep. 14, 2018 Japanese Office Action, which is enclosed without an English Translation, that issued in Japanese Patent Application No. 2014263351.

* cited by examiner

IMAGING APPARATUS AND CONTROL METHOD FOR COMBINING RELATED VIDEO IMAGES WITH DIFFERENT FRAME RATES

FIELD OF THE INVENTION

The present invention relates to an imaging apparatus.

DESCRIPTION OF THE RELATED ART

Conventionally, an apparatus that records moving images each having a different frame rate has been proposed (for example, see Japanese Patent Laid-Open No. 2011-9970). In the case where a recorded moving image is reproduced and output to an external display device, the reproduced moving image is output after being converted so as to have a frame rate that matches the frame rate of the display device. There also is a conventionally-known editing apparatus that generates a single moving image by combining a plurality of moving images together.

However, in a case where the frame rates of the plurality of moving images to be combined are different from each other, simply combining these moving images results in a moving image being composed of a mix of portions having different frame rates. Therefore, in a case where such a moving image is reproduced, a problem arises in which the playback speed changes midway.

Considering the above, when generating a single moving image, it is conceivable that conversion is performed such that the frame rates of the portions of the moving image have a constant value. However, in a case where the screen sizes and the frame rates of the moving images to be edited are large, a problem arises in which an embedded device such as a digital camera takes a long time to complete the process, or is unable to perform the process in the first place.

SUMMARY OF THE INVENTION

The present invention is made in view of the problems above, and, in the case of generating a single moving image from a plurality of moving images, makes it possible to swiftly generate a moving image having a constant frame rate, using a simple configuration.

According to a first aspect of the present invention, there is provided an imaging apparatus comprising: an imaging unit; a recording unit configured to record a piece of moving image data obtained by the imaging unit to a recording medium; a setting unit configured to set a frame rate of a piece of moving image data to be recorded by the recording unit from among a plurality of predetermined frame rates; a selection unit configured to select a piece of moving image data to be edited from among a plurality of pieces of moving image data recorded on the recording medium; and a generation unit configured to generate a piece of moving image data having a first frame rate by combining pieces of moving image data selected by the selection unit, wherein the selection unit sets, as the first frame rate, a frame rate that has been set by the setting unit, and selects, as the piece of moving image data to be edited, a piece of moving image data having a second frame rate that is related to the first frame rate, based on frame rates of the plurality of pieces of moving image data and the first frame rate.

According to a second aspect of the present invention, there is provided an imaging apparatus comprising: an imaging unit; a recording unit configured to record a piece of moving image data obtained by the imaging unit to a recording medium; a setting unit configured to set, as a frame rate of a piece of moving image data to be recorded by the recording unit, one of a plurality of predetermined frame rates that include a first frame rate and a second frame rate that each correspond to an NTSC system, and a third frame rate and a fourth frame rate that each correspond to a PAL system; a selection unit configured to select a piece of moving image data to be edited from among a plurality of pieces of moving image data recorded on the recording medium, based on the frame rate set by the setting unit; and a generation unit configured to generate combined moving image data by combining pieces of moving image data selected by the selection unit, wherein if the first frame rate has been set by the setting unit, the selection unit selects, as the piece of moving image data to be edited, a piece of moving image data having the first frame rate and a piece of moving image data having the second frame rate, and the generation unit generates a piece of moving image data having the first frame rate by combining the pieces of moving image data selected by the selection unit, if the second frame rate has been set by the setting unit, the selection unit selects, as the piece of moving image data to be edited, a piece of moving image data having the first frame rate and a piece of moving image data having the second frame rate, and the generation unit generates a piece of moving image data having the second frame rate by combining the pieces of moving image data selected by the selection unit, if the third frame rate has been set by the setting unit, the selection unit selects, as the piece of moving image data to be edited, a piece of moving image data having the third frame rate and a piece of moving image data having the fourth frame rate, and the generation unit generates a piece of moving image data having the third frame rate by combining the pieces of moving image data selected by the selection unit, and if the fourth frame rate has been set by the setting unit, the selection unit selects, as the piece of moving image data to be edited, a piece of moving image data having the third frame rate and a piece of moving image data having the fourth frame rate, and the generation unit generates a piece of moving image data having the fourth frame rate by combining the pieces of moving image data selected by the selection unit.

According to a third aspect of the present invention, there is provided a control method of an imaging apparatus having an imaging unit, the method comprising: recording a piece of moving image data obtained by the imaging unit to a recording medium; setting a frame rate of a piece of moving image data to be recorded by the recording from among a plurality of predetermined frame rates; selecting a piece of moving image data to be edited from among a plurality of pieces of moving image data recorded on the recording medium; and generating a piece of moving image data having a first frame rate by combining a plurality of pieces of moving image data selected by the selecting, wherein in the selecting, a frame rate that has been set by the setting is set as the first frame rate, and a piece of moving image data having a second frame rate that is related to the first frame rate is selected as the piece of moving image data to be edited, based on frame rates of the plurality of pieces of moving image data and the first frame rate.

Further features of the present invention will become apparent from the following description of exemplary embodiments with reference to the attached drawings.

DESCRIPTION OF THE EMBODIMENTS

The following describes an embodiment of the present invention in detail with reference to the accompanying drawings. Although the present embodiment provides a description of a case where the present invention is applied to an imaging apparatus such as a digital camera, the present invention is not limited to an imaging apparatus, and may be a mobile telephone.

Figure 1:
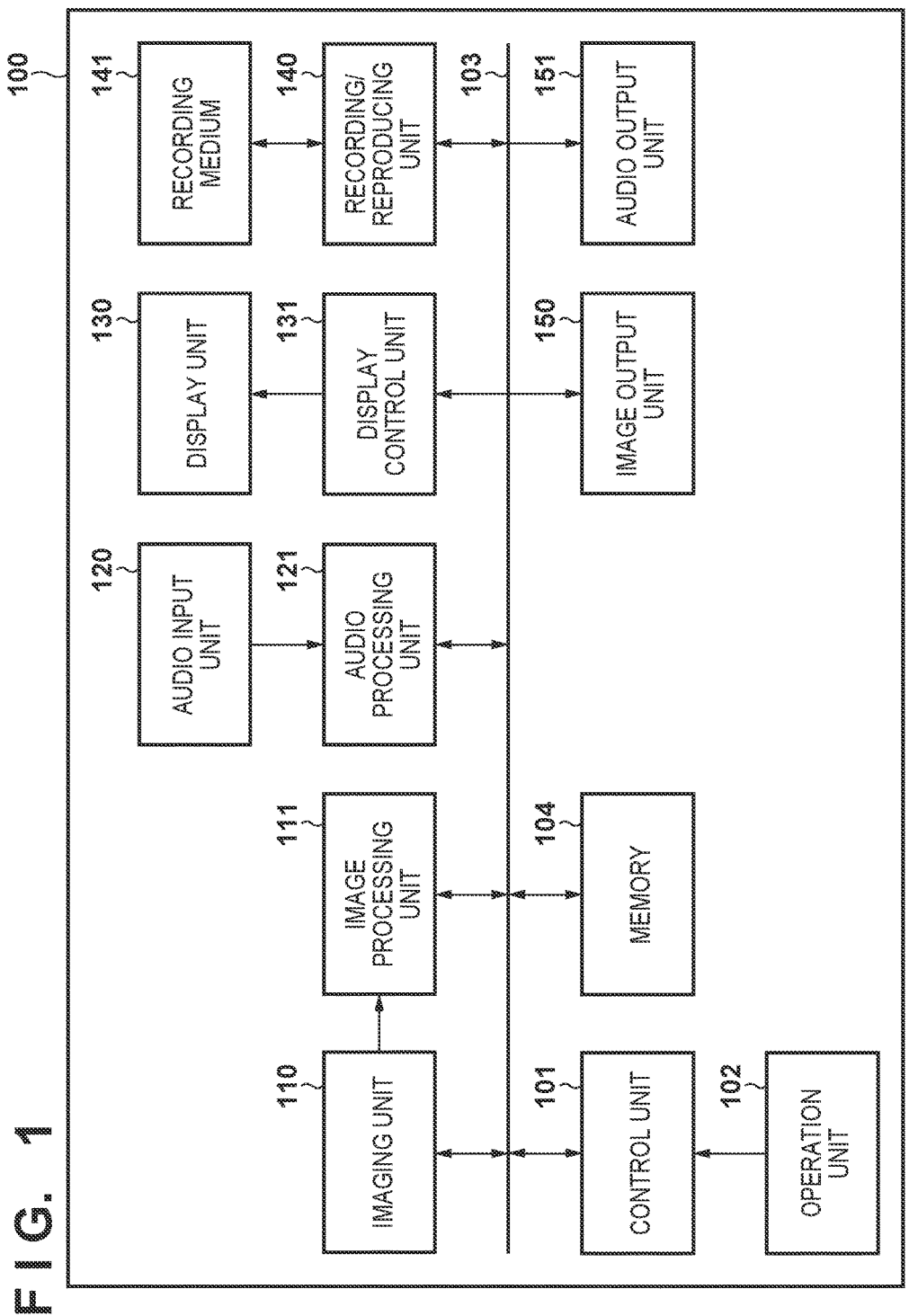
FIG. 1 is a block diagram showing a configuration of an imaging apparatus according to an embodiment of the present invention.

FIG. 1 is a block diagram showing a configuration of an imaging apparatus 100 according to the present embodiment. In FIG. 1, a control unit 101 includes a CPU (MPU) and a memory (DRAM, SRAM) for example, and executes various kinds of processes (programs) to control each block in the imaging apparatus 100 and control data transfer between the blocks, for example. Also, the control unit 101 controls each block of the imaging apparatus 100 in response to an operation signal from an operation unit 102, which accepts operations from a user. Also, the control unit 101 analyzes an image obtained by an image processing unit 111, which is described below, and controls each block of the imaging apparatus 100 according to the results of analysis.

The operation unit 102 includes switches and the like for inputting various kinds of operations related to image capturing, such as a power button, a still image recording button, a moving image recording start button, a zooming adjustment button, and an autofocus button. The operation unit 102 also includes a menu display button, an enter button, other cursor keys, a pointing device, a touch panel, and so on, and transmits an operation signal to the control unit 101 when these keys or buttons are operated by the user.

A bus 103 is a general-purpose bus for transmitting various kinds of data, control signals, instruction signals, and so on to each block of the imaging apparatus 100.

An imaging unit 110 controls, with a diaphragm, the amount of light of an optical image of the subject taken in by a lens, and converts, with an imaging sensor such as a CCD sensor or a CMOS sensor, the optical image into an image signal, and transmits the image signal to the image processing unit 111 after performing analog/digital conversion thereon. As described below, in the case of having received an instruction to record a still image, the imaging unit 110 obtains and outputs a still image signal for one screen according to the recording instruction. Also, in a recording standby state or a moving image recording state, the imaging unit 110 outputs a moving image signal with which one screen has 1920 horizontal pixels×1080 vertical pixels for example. Also, as described below, when recording a moving image, the imaging unit 110 outputs a moving image signal that has a frame rate specified by the control unit 101.

The image processing unit 111 applies a process for obtaining a still image signal or a process for obtaining a moving image signal to an input image signal. In other words, the image processing unit 111 performs an image quality adjustment process, which is the process of making an adjustment to the white balance, the color, the brightness, and so on based on setting values. Then, still image data or moving image data, which has been processed by the image processing unit 111, is transmitted to a memory 104 and to an image output unit 150 and a display control unit 131, which are described below, according to an instruction from the control unit 101.

An audio input unit 120 collects (picks up) sound around the imaging apparatus 100 by using, for example, a built-in omnidirectional microphone or an external microphone connected via an audio input terminal, and transmits the sound to an audio processing unit 121 after performing analog/digital conversion thereon. The audio processing unit 121 performs an audio-related process such as a level optimization process for an input digital audio signal. The audio signal processed by the audio processing unit 121 is then transmitted to the memory 104 according to an instruction from the control unit 101. The memory 104 temporarily stores the image signal and the audio signal respectively obtained by the image processing unit 111 and the audio processing unit 121.

The image processing unit 111 and the audio processing unit 121 also read out the image signal and the audio signal temporarily stored in the memory 104, and, for example, encode the image signal and the audio signal to generate, for example, a compressed image signal, and a compressed audio signal, respectively. The control unit 101 transmits the compressed image signal and the compressed audio signal to a recording/reproducing unit 140.

The recording/reproducing unit 140 records, to a recording medium 141, the compressed image signal and the compressed audio signal respectively generated by the image processing unit 111 and the audio processing unit 121, and other control data, etc., related to image capturing. Also, in a case where the audio signal is not subjected to compression-coding, the control unit 101 transmits the audio signal generated by the audio processing unit 121 and the compressed image signal generated by the image processing unit 111 to the recording/reproducing unit 140 so as to be recorded to the recording medium 141. Here, the recording medium 141 may be a recording medium that is built into the imaging apparatus or a removable recording medium, insofar as the compressed image signal, the compressed audio signal, the audio signal, various kinds of data, etc., generated by the imaging apparatus 100 can be recorded thereto. Examples of the recording medium 141 include a hard disk, an optical disc, a magneto-optical disc, a CD-R, a DVD-R, a magnetic tape, a nonvolatile semiconductor memory, a flash memory, and recording media of any other types.

Also, the recording/reproducing unit 140 reads out (reproduces) the compressed image signal, the compressed audio signal, the audio signal, various kinds of data, and programs, recorded on the recording medium 141. The control unit 101 then transmits the compressed image signal and the compressed audio signal, which have been read out, to the image processing unit 111 and the audio processing unit 121. The image processing unit 111 and the audio processing unit 121 cause the memory 104 to temporarily store the compressed image signal and the compressed audio signal, decode the compressed image signal and the compressed audio signal according to predetermined procedures, and transmit the decoded audio signal to an audio output unit 151 and the decoded image signal to the image output unit 150 and the display control unit 131. Also, in a case where an audio signal in an uncompressed state is recorded on the recording medium 141, the control unit 101 transmits the audio signal directly to the audio output unit 151.

The audio output unit 151 includes, for example, an audio output terminal, and transmits the audio signal in order to output audio from an earphone, a speaker, etc., connected thereto. The audio output unit 151 may be a speaker that is built into the imaging apparatus 100 and outputs audio related to the audio signal.

The display control unit 131 causes a display unit 130 to display, for example, an image based on the image signal transmitted from the image processing unit 111 and an operation screen (menu screen) used for operating the imaging apparatus 100. The display unit 130 may be any display device, such as a liquid crystal display, an organic EL display, or electronic paper.

Hereafter, a description is given of normal operations of the imaging apparatus 100 according to the present embodiment. In the imaging apparatus 100 according to the present embodiment, an instruction to start up is issued from the operation unit 102 to the control unit 101 when the user operates the power button of the operation unit 102. In response to this instruction, the control unit 101 controls a power supply unit, which is not shown in the drawings, to supply each block of the imaging apparatus 100 with power.

When power is supplied, the control unit 101 checks an instruction signal from the operation unit 102 to determine, for example, which mode is selected with, for example, a mode switch of the operation unit 102, from among a plurality of modes including, for example, a still image recording mode, a moving image recording mode, and a reproduction mode.

In the still image recording mode, in a case where the user has made an instruction to record a still image by operating the operation unit 102 of the imaging apparatus 100 in the recording standby state, the still image signal obtained by the imaging unit 110 is recorded to the recording medium 141. The imaging apparatus 100 then enters the recording standby state again. In the moving image recording mode, in a case where the user has made an instruction to record a moving image by operating the operation unit 102 of the imaging apparatus 100 in the recording standby state, the imaging apparatus 100 starts recording a moving image signal and an audio signal. In the case where the user has made an instruction to end the recording of the moving image by operating the operation unit 102, the imaging apparatus 100 ends the recording of the moving image signal and the audio signal, and enters the recording standby state again. In the reproduction mode, the imaging apparatus 100 reproduces, from the recording medium 141, a compressed image signal and a compressed audio signal, or an audio signal, related to the file selected by the user, and outputs the audio signal from the audio output unit 151 and causes the display unit 130 to display the reproduced image.

First, a description is given of the still image recording mode. When the still image recording mode is set by the operation unit 102, first, as described above, the control unit 101 sets each block of the imaging apparatus 100 to enter the recording standby state. In the recording standby state, the control unit 101 controls the imaging unit 110 so as to output a moving image signal. The image processing unit 111 transmits the moving image signal, which has been output from the imaging unit 110, to the display control unit 131, and causes the display unit 130 to display the moving image signal. The user prepares for image capturing while viewing the screen thus displayed.

In the recording standby state, when the user operates the operation unit 102 and accordingly an instruction to record a still image is output, the control unit 101 outputs a control signal to each block of the imaging apparatus 100, thereby performing control to cause each block to operate in the following manner. In response to the instruction to record a still image, the imaging unit 110 obtains an image signal for one screen, and transmits the image signal to the image processing unit 111. In response to the input image signal, the image processing unit 111 executes the image quality adjustment process for still images (for making an adjustment to the white balance, color, brightness, etc.), based on the setting values. The still image signal processed by the image processing unit 111 is then transmitted by the control unit 101 to the memory 104, the image output unit 150, and the display control unit 131. At this stage, the user can check the captured still image by viewing the image displayed by the display unit 130.

The image processing unit 111 then reads out the still image signal temporarily stored in the memory 104 and performs predetermined encoding to generate a compressed still image signal, and outputs the compressed still image signal to the recording/reproducing unit 140. The recording/reproducing unit 140 records the compressed still image signal to the recording medium 141. In the present embodiment, various kinds of information including the still image signal, the moving image signal, and the audio signal recorded on the recording medium 141 are managed in the form of a file according to a file system such as UDF or FAT.

When the encode operation by the image processing unit 111 ends, the control unit 101 transmits a control signal to each block of the imaging apparatus 100 to cause a transition to the recording standby state, and thus causes the imaging apparatus 100 to return to the recording standby state.

Next, a description is given of the moving image recording mode. When the moving image recording mode is set by the operation unit 102, first, as described above, the control unit 101 sets each block of the imaging apparatus 100 to enter the recording standby state. In the present embodiment, the frame rate of the moving image signal to be recorded can be set by the user operating the operation unit 102 in the recording standby state. In the present embodiment, the user can select any one of a plurality of predetermined frame rates. It is assumed here that the frame rate that can be set by the user is 24 frames per second (hereinafter "fps"), 25 fps, 29.97 fps, 50 fps, or 59.94 fps. Note that the frame rate is prescribed according to the broadcasting system such as NTSC or PAL. For example, the frame rate according to NTSC is 29.97 fps, and the frame rate according to PAL is 25 fps.

In the recording standby state, the image processing unit 111 transmits the image signal to the display control unit 131, and causes the display unit 130 to display the image signal. The user prepares for image capturing while viewing the screen thus displayed. Note that in the recording standby state, a moving image at a predetermined frame rate, for example 30 fps, is obtained by the imaging unit 110 and displayed by the display unit 130, regardless of the value that has been set as the frame rate of the moving image to be recorded.

In the recording standby state, when the user operates the operation unit 102 and accordingly an instruction to start recording a moving image is output, the control unit 101 outputs a control signal to each block of the imaging apparatus 100, thereby performing control to cause each block to operate in the following manner.

The imaging unit 110 obtains a moving image signal having the frame rate set by the user, and transmits the moving image signal to the image processing unit 111. In response to the input moving image signal, the image processing unit 111 executes an image quality adjustment process for moving image signals (for making an adjustment to the white balance, color, brightness, etc.), based on the setting values. The moving image signal processed by the image processing unit 111 is then transmitted by the control unit 101 to the display control unit 131 and the memory 104. The display control unit 131 causes the display unit 130 to display a moving image according to the received moving image signal.

Meanwhile, the audio input unit 120 performs analog/digital conversion on the analog audio signal obtained by the microphone, and transmits the obtained digital audio signal to the audio processing unit 121. The audio processing unit 121 performs, for example, a level optimization process on the input digital audio signal, and outputs the audio signal. The control unit 101 transmits the audio signal processed by the audio processing unit 121 to the memory 104.

The image processing unit 111 and the audio processing unit 121 then read out the moving image signal and the audio signal temporarily stored in the memory 104 and perform predetermined encoding thereon to generate a compressed moving image signal and a compressed audio signal, respectively.

The control unit 101 then multiplexes the compressed moving image signal and audio signal to form a data stream for recording, and outputs the data stream to the recording/reproducing unit 140. The recording/reproducing unit 140 continuously writes the data stream to the recording medium 141 as a single moving image file. In a case where audio is not to be compressed, the control unit 101 outputs the audio signal generated by the audio processing unit 121 to the recording/reproducing unit 140 together with the compressed moving image signal generated by the image processing unit 111. The recording/reproducing unit 140 then continuously writes the data stream to the recording medium 141 as a single moving image file. The operations above are continuously performed during the recording of the moving image. Also, the control unit 101 instructs the recording/reproducing unit 140 to store, to the moving image file, additional information for identifying the frame rate of the moving image data that is being recorded, and thus record the additional information. The recording/reproducing unit 140 stores, to the moving image file that is being recorded, the additional information for identifying the frame rate of the moving image data, and thus records the additional information.

While the moving image is being recorded, the control unit 101 transmits various kinds of control signals to the imaging unit 110, the image processing unit 111, the audio processing unit 121, and so on according to an operation performed by the user on the operation unit 102 or according to the results of analysis of the image signal generated by the image processing unit 111. For example, the control unit 101 transmits control signals for moving the lens and making an adjustment to the diaphragm to the imaging unit 110, and control signals for making an adjustment to images and audio to the image processing unit 111 and the audio processing unit 121.

When the user operates the operation unit 102 and accordingly an instruction to end the recording of the moving image is output to the control unit 101, the control unit 101 then transmits a control signal for stopping the recording to each block of the imaging apparatus 100, thereby performing control to cause each block to operate in the following manner.

The image processing unit 111 and the audio processing unit 121 stop transmitting the moving image signal and the audio signal to the memory 104, respectively. The image processing unit 111 and the audio processing unit 121 then read out the remaining portions of the moving image signal and the audio signal stored in the memory 104 and perform predetermined encoding thereon to generate the compressed moving image signal, the compressed audio signal, and so on.

The control unit 101 multiplexes the moving image signal and the audio signal to form a data stream, and outputs the data stream to the recording/reproducing unit 140. The recording/reproducing unit 140 records the data stream to the recording medium 141, and stops the recording when the data stream stops being supplied. The control unit 101 performs control to cause the following operations to be performed in order to generate thumbnails.

The recording/reproducing unit 140 reads out the leading frame of the moving image signal recorded on the recording medium 141, and transmits the leading frame to the image processing unit 111. The image processing unit 111 causes the memory 104 to temporarily store the image signal of the leading frame thus read out, and decodes the image signal according to predetermined procedures. Next, the image processing unit 111 performs predetermined encoding for thumbnails on the obtained image signal, thereby generating a compressed image signal for thumbnails. The control unit 101 then outputs the compressed image signal for thumbnails to the recording/reproducing unit 140. The recording/reproducing unit 140 stores the image signal for thumbnails in a moving image file, writes the moving image file to the recording medium 141, thereby completing the moving image file, and stops the recording operation.

When the recording operation stops, the control unit 101 transmits a control signal to each block of the imaging apparatus 100 to cause a transition to the recording standby state, and thus causes the imaging apparatus 100 to return to the recording standby state.

Next, a description is given of the reproduction mode. When the reproduction mode is set by the operation unit 102, the control unit 101 transmits a control signal to each block of the imaging apparatus 100 to cause each block to transition to the reproduction state, and thus causes each block to operate in the following manner.

The recording/reproducing unit 140 reads out the thumbnail image signal from the still image file or the moving image file recorded on the recording medium 141. The control unit 101 causes the image processing unit 111 to decode the thumbnail image signal thus read out, and furthermore, changes the size of the thumbnail image to a size suited for an index screen and sends the thumbnail image to the display control unit 131. The display control unit 131 generates an index screen that includes thumbnail images from the image processing unit 111, and displays the index screen on the display unit 130.

The user operates the operation unit 102 to select a desirable thumbnail image from the index screen displayed on the display unit 130, and makes an instruction to reproduce the thumbnail image. The control unit 101 performs control to read out the moving image signal and the audio signal, or the still image signal, which are stored in the moving image file or the still image file corresponding to the thumbnail image selected by the user, from the recording medium 141. The control unit 101 outputs the moving image signal or the still image signal thus read out to the image processing unit 111, and outputs the audio signal thus read out to the audio processing unit 121. When the audio signal is an uncompressed audio signal, the control unit 101 transmits the audio signal to the audio output unit 151.

The image processing unit 111 and the audio processing unit 121 cause the memory 104 to temporarily store the moving image signal, the still image signal, and the audio signal, and decode the moving image signal, the still image signal, and the audio signal according to predetermined procedures. The control unit 101 then transmits the decoded audio signal to the audio output unit 151, and the decoded moving image signal and the decoded still image signal to the image output unit 150 and the display control unit 131. The display control unit 131 causes the display unit 130 to display the image corresponding to the input image signal, and the audio output unit 151 outputs audio corresponding to the input audio signal from a built-in speaker, or an earphone or a speaker connected thereto.

Next, a description is given of the editing process according to the present embodiment. As described above, the imaging apparatus 100 is capable of performing the editing process, which is the process of generating a single moving image signal by combining moving image signals stored in a plurality of moving image files and still image signals stored in a plurality of still image files recorded on the recording medium 141. In the editing process, the moving image signal or the still image signal in the file selected from among the moving image files and the still image files recorded on the recording medium 141 is provisionally decoded. Then, the decoded moving image signal and the decoded audio signal are combined into a single moving image signal such that a predetermined reproduction order is achieved, and then the single moving image signal is compressed again and recorded to the recording medium 141 as a single moving image file.

Figure 2:
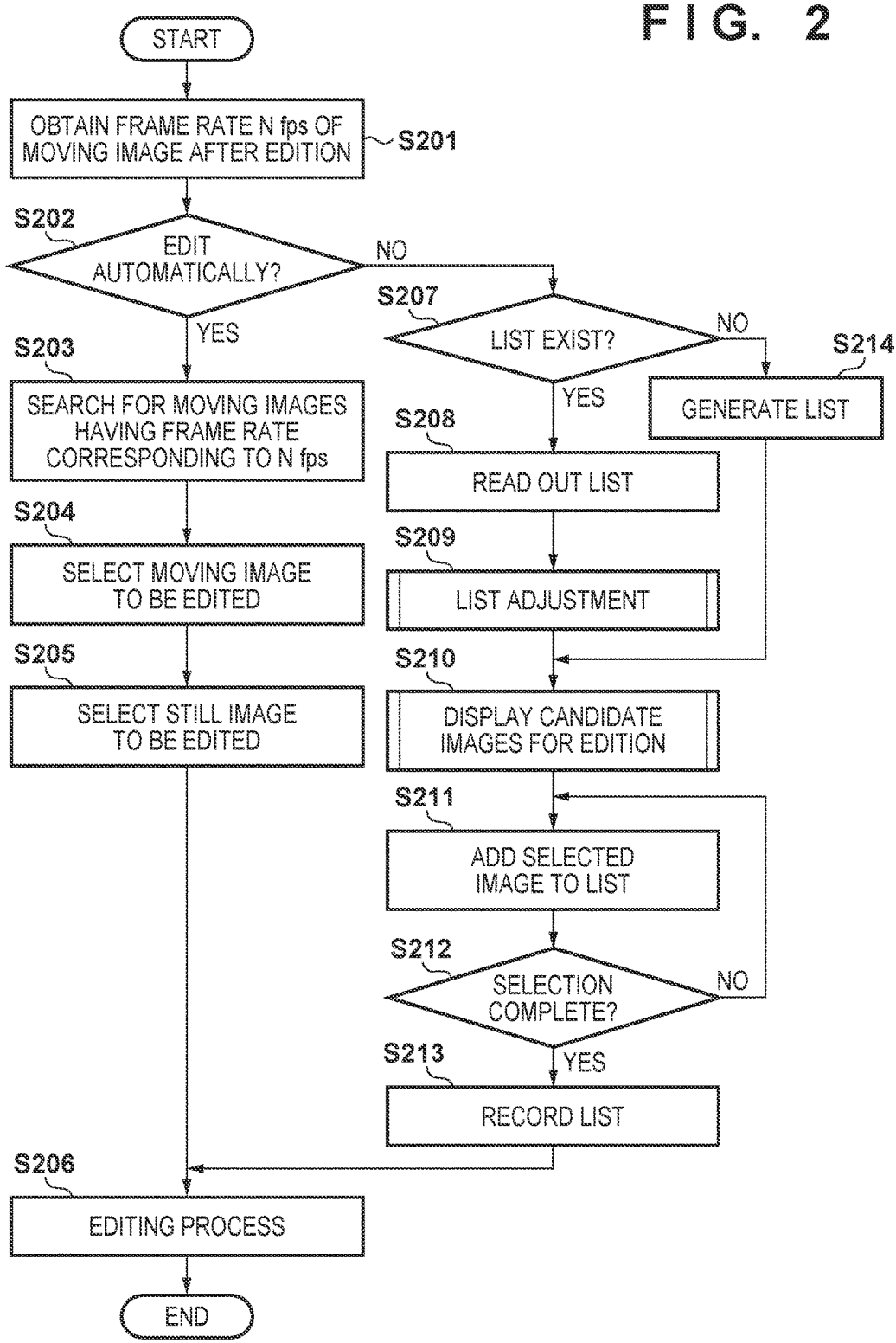
FIG. 2 is a flowchart showing an editing process.

FIG. 2 is a flowchart illustrating the operations of the imaging apparatus 100 during the editing process. The process shown in FIG. 2 is executed by the control unit 101 controlling each unit of the imaging apparatus 100. In the case where the user has specified the editing process by operating the operation unit 102 in any mode, the process shown in FIG. 2 is started.

The control unit 101 first obtains information about the frame rate N fps of the moving image to be generated by the editing process as described above (step S201). In the present embodiment, the value that is currently set as the frame rate of the moving image that is to be recorded in the moving image recording mode is used as the frame rate N of the moving image after editing. The control unit 101 in the moving image recording mode stores information about the frame rate that is set by the user to an internal nonvolatile memory. Therefore, the control unit 101 here reads out the value of the frame rate stored in the memory. Alternatively, any one of the values that can be set as the frame rate of the moving image to be recorded may be used as the frame rate N of the moving image after editing. Also, a configuration may be adopted in which when the user makes an instruction to perform the editing process, the frame rate of the moving image after editing is set to any of the frame rates that can be set when recording. If this is the case, a configuration may be adopted in which the user is prompted to select one of the broadcasting systems (NTSC, PAL) instead of the value of a frame rate.

Next, the control unit 101 instructs the display control unit 131 to display, on the display unit 130, a screen for asking the user as to whether the control unit 101 should perform automatic editing or the process of prompting the user to select the moving image and the still image to be edited (step S202). In the automatic editing process, the control unit 101 determines whether or not each image of the moving image files and the still image files fulfills predetermined conditions, and automatically selects the moving image and the still image to be edited, based on the results of determination. Then, using the moving image and the still image to be edited that have been automatically selected by the control unit 101, a single moving image is generated. Here, the conditions for determination are, for example, the number of faces of the subjects detected in the image, the smile intensity, the contrast of the image, camera shake, and blur. As described above, these kinds of information are obtained at the recording of a moving image or a still image, by the image processing unit 111 analyzing the contents of the image, and are added to the file and recorded.

Also, in the automatic editing process, the user can specify the period of the recording date of the moving image and the still image to be edited. Therefore, in a case where the automatic editing has been selected in step S202, the control unit 101 causes the display unit 130 to also display a screen for asking the user as to the period to be edited. In the present embodiment, the range can be specified on a monthly basis or a daily basis, for example.

Next, the control unit 101 detects, from among the moving image files recorded on the recording medium 141, moving image files having a recording date that is within the period to be edited. Furthermore, the control unit 101 searches for moving image files having a frame rate that corresponds to N fps, which is the frame rate of the moving image after editing (step S203). Here, the control unit 101 searches for not only moving images having a frame rate of N fps, but also moving images having a frame rate that is an integer multiple of N, or N multiplied by one over an integer. For example, in a case where N is 29.97, a moving image having a frame rate of 29.97 fps and a moving image having a frame rate of 59.94 fps are both searched for.

Next, the control unit 101 determines whether or not the moving image files found as a result of the search conducted in step S203 fulfill the predetermined conditions as described above, and consequently selects a moving image file to be edited (step S204). Next, the control unit 101 detects, from among the still image files recorded on the recording medium 141, still image files having a recording date that is within the period to be edited. Then, the control unit 101 determines whether or not the detected still image files fulfill the predetermined conditions, and thus selects a still image file to be edited (step S205).

When the moving image file and the still image file to be edited are selected as described above, the control unit 101 performs the editing process, which is the process of generating a single moving image from the selected moving image file and still image file (step S206). In other words, the control unit 101 reproduces the selected moving image file and still image file from the recording medium 141 in order of recording date. In the case of reproducing a moving image file, the control unit 101 decodes the moving image signal reproduced by the image processing unit 111, and also decodes the audio signal reproduced by the audio processing unit 121. In the case where the frame rate of the reproduced moving image is an integer multiple of the frame rate N of the moving image after editing, the control unit 101 changes the frame rate to N fps by thinning out some frames of the decoded moving image. In the case where the frame rate of the reproduced moving image is the frame rate N of the moving image after editing multiplied by one over an integer, the control unit 101 changes the frame rate to N fps by repeatedly inserting some frames of the decoded moving image. In the case where the frame rate of the reproduced moving image is the frame rate N of the moving image after editing, the control unit 101 does not change the frame rate of the decoded moving image.

When the moving image and the audio have been decoded, the control unit 101 encodes the decoded moving image signal again by using the image processing unit 111.

At this stage, in a case where the frame rate of the moving image signal has been changed to N fps, the moving image signal having a frame rate of N fps is encoded and compressed again. The control unit 101 also encodes the decoded audio signal again by using the audio processing unit 121. The compressed moving image signal and the compressed audio signal are provisionally stored in the memory 104.

The control unit 101 then reads out the encoded moving image signal and the encoded audio signal from the memory 104 and multiplexes them to generate a data stream after editing, and outputs the data stream to the recording/reproducing unit 140. The recording/reproducing unit 140 sequentially records the data stream to the recording medium 141. Note that in the present embodiment, control is performed such that reading out of the moving image to be edited from the recording medium 141 and writing of the data stream including the moving image signal and the audio signal after editing are performed in parallel. For example, the recording/reproducing unit 140 first reads out a predetermined amount of a moving image signal and an audio signal to be edited, and then reads out the data stream after editing from the memory 104 and writes the data stream to the recording medium 141.

Also, in a case where the still image signal is reproduced, the control unit 101 decodes the reproduced still image signal by using the image processing unit 111. The control unit 101 then controls the image processing unit 111 so as to generate a moving image having a predetermined time length, for example several seconds or so, by repeatedly encoding the decoded still image signal. At this stage, the image processing unit 111 sets N fps as the frame rate of the moving image signal to be generated from the still image signal. Also, in a case where the number of pixels of the reproduced still image is different from the number of pixels of the moving image signal after editing, the image processing unit 111 changes the number of pixels of the decoded still image to be equal to the number of pixels of the moving image. The image processing unit 111 also performs the process of making an adjustment to the image quality of the reproduced still image such that the image quality suits the moving image. The image processing unit 111 provisionally stores the moving image signal generated from the still image signal to the memory 104. The recording/reproducing unit 140 then reads out the moving image signal from the memory 104, and records the moving image signal to the recording medium 141 as a single moving image.

In this way, the moving image file and the still image file to be edited are sequentially read out from the recording medium 141 and are decoded, encoded again, and recorded to the recording medium 141 as a single moving image signal, and thus a single moving image signal after editing is generated.

When all the processes for the moving image file and the still image file selected as the files to be edited have completed, the control unit 101 ends the editing process.

In the case where automatic editing is not selected in step S202, the control unit 101 performs a process for manual editing. In other words, the control unit 101 determines whether or not list information is recorded on the recording medium 141 (step S207). List information serves as management information for managing the moving image files and the still image files that were selected as files to be edited during the manual editing process performed in the past.

In the case where list information is recorded on the recording medium 141, the control unit 101 controls the recording/reproducing unit 140 to read out the list information from the recording medium 141, and stores it to the memory 104 (step S208). On the other hand, in a case where list information is not recorded on the recording medium 141, the control unit 101 generates list information and stores it to the memory 104 (step S214). Note that list information immediately after being generated naturally does not include information about files.

After storing the list information to the memory 104 in step S208, the control unit 101 performs the process of making an adjustment to the list information that has been read out (step S209).

Figure 3A:
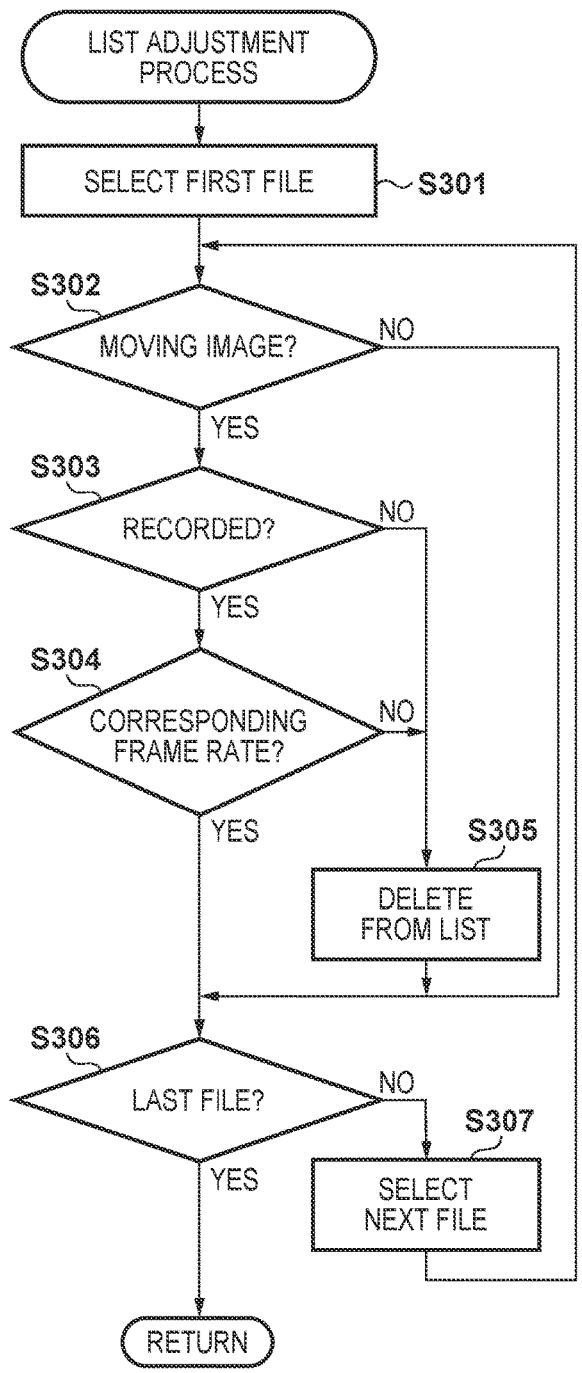
FIGS. 3A and 3B are flowcharts showing a list adjustment process.

FIG. 3A is a flowchart showing the list adjustment process. First, the control unit 101 selects the first file indicated by the list information (step S301), and determines whether or not the first file is a moving image file (step S302). In the case where the first file is not a moving image file but a still image file, the control unit 101 proceeds to step S306.

On the other hand, in a case where the first file is a moving image file, the control unit 101 determines whether or not the moving image file is recorded on the recording medium 141 (step S303), and in a case where the moving image file is not recorded on the recording medium 141, the control unit 101 deletes information about this moving image file from the list information (step S305). In a case where the moving image file is recorded on the recording medium 141, the control unit 101 determines whether or not the frame rate of this moving image file is a frame rate that corresponds to the frame rate N of the moving image after editing (step S304). Here, as described above, it is assumed that not only moving images having a frame rate of N fps, but also moving images having a frame rate that is an integer multiple of N, or N multiplied by one over an integer, are regarded as moving images having a frame rate that corresponds to the frame rate of the moving image after editing.

In the case where the frame rate of the moving image file is not a frame rate that corresponds to the frame rate N of the moving image after editing, the control unit 101 deletes information about this moving image file from the list information (step S305).

In the case where the frame rate of the moving image file is a frame rate that corresponds to the frame rate N of the moving image after editing, the control unit 101 leaves information about this moving image file as it is in the list information. The control unit 101 then determines whether or not the file to be processed is the last file in the list (step S306), and ends the process in a case where the file is the last file. In the case where the file is not the last file, the control unit 101 selects the next file in the list, and returns to step S302 (step S307).

The adjustment process performed in this way results in the list information including information about moving image files having a frame rate that corresponds to the frame rate of the moving image signal after editing, from among the moving image files recorded on the recording medium 141.

After performing the adjustment process on the list information, the control unit 101 performs the process of displaying, on the display unit 130, the thumbnail images of the moving image files and the still image files that are candidates for the image files to be edited, from among the moving image files and the still image files recorded on the recording medium 141 (S210).

Figure 4:
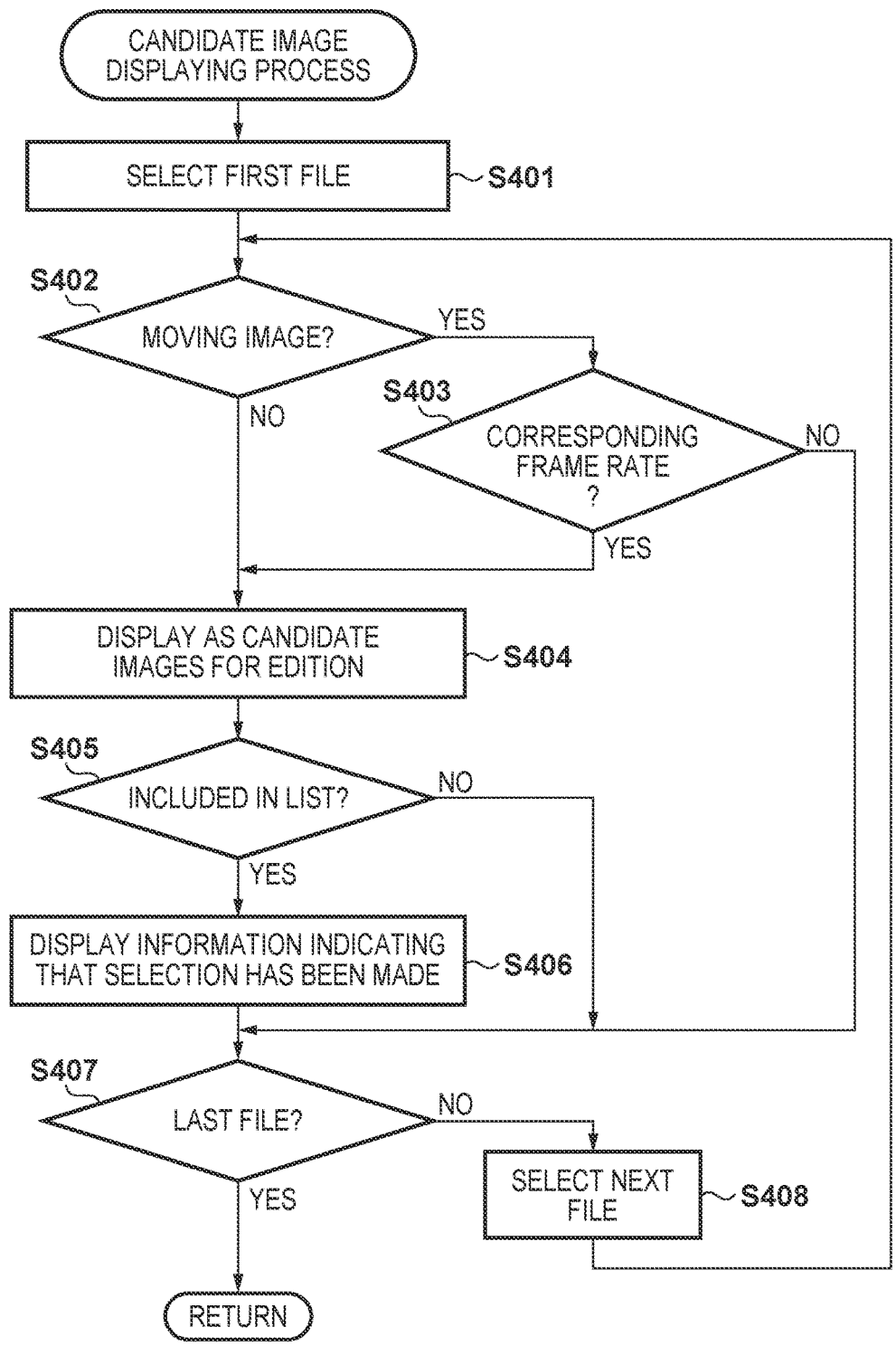
FIG. 4 is a flowchart showing a candidate image displaying process.

FIG. 4 is a flowchart showing the displaying process performed in step S210. The control unit 101 selects the leading file in a predetermined order from among the moving image files and the still image files recorded on the recording medium 141 (step S401). The control unit 101 then determines whether or not this file is a moving image file (step S402). In the case where the file is not a moving image file but a still image file, the control unit 101 controls the display control unit 131 so as to display, on the display unit 130, the thumbnail image of the still image file as a candidate image for editing (step S404)

In the case of having determined in step S402 that the file is a moving image file, the control unit 101 determines whether or not the frame rate of this moving image file is a frame rate that corresponds to the frame rate N of the moving image after editing (step S403). Here, as described above, it is assumed that not only moving images having a frame rate of N fps, but also moving images having a frame rate that is an integer multiple of N, or N multiplied by one over an integer, are regarded as moving images having a frame rate that corresponds to the frame rate of the moving image after editing.

In the case where the frame rate is not a frame rate that corresponds to the frame rate N, the control unit 101 excludes this moving image file from the candidates for editing, and proceeds to step S407 without displaying a thumbnail image. In the case where the frame rate is a frame rate that corresponds to the frame rate N, the control unit 101 controls the display control unit 131 so as to display, on the display unit 130, the thumbnail image of the moving image file as a candidate image for editing (step S404)

Next, the control unit 101 determines whether or not the moving image file or the still image file to be processed is included in the list information that has undergone the adjustment process as described above (step S405). In the case where the file is not included in the list information, the control unit 101 proceeds to step S407. In the case where the file is included in the list information, the control unit 101 performs control to display predetermined information for enabling the user to discern that the file corresponding to the thumbnail image displayed on the display unit 130 has been selected as a candidate for editing (step S406). For example, the control unit 101 superimposes an icon, which indicates that the file has been selected, on the corresponding thumbnail image, or displays the icon in the vicinity of the thumbnail image.

The control unit 101 then determines whether or not the file to be processed is the last file that can be displayed on the display screen for displaying the candidate images (step S407), and ends the process in a case where the file is the last file. In the case where the files is not the last file, the control unit 101 selects the next file and returns to step S402 (step S408).

In this way, the thumbnail images of the moving images and the still images having a frame rate that corresponds to the frame rate of the moving image after editing are displayed on the display unit 130 as candidate images for editing. Also, information about the moving images and the still images that were selected in the past by manual editing is displayed as well.

The user selects the moving image file and the still image file to be edited by operating the operation unit 102 while viewing the thumbnail images that are displayed. Information indicating that selection has been performed is displayed with respect to the thumbnails of the selected files. The control unit 101 adds information about the moving image file or the still image file selected by the user to the list information stored in the memory 104 (step S211). In this way, the user selects the moving image and the still image to be edited, and when selection is completed (step S212), the control unit 101 instructs the recording/reproducing unit 140 to read out the list information from the memory 104 and record the list information to the recording medium 141 (step S213). The recording/reproducing unit 140 reads out the list information from the memory 104, and records the list information to the recording medium 141. In the case where the list information has already been recorded on the recording medium 141, the recording/reproducing unit 140 overwrites the list information that has been recorded.

The control unit 101 then performs the editing process based on the list information stored in the memory 104 (step S206). In this regard, the control unit 101 sequentially reads out, decodes, and then re-encodes the moving image files and the still image files from the top of the list, thereby combining the moving images and the still images, and generating a single moving image signal.

In this way, in the present embodiment, in the case of generating a single moving image by combining a plurality of recorded moving images, moving images having a frame rate that is the same as the frame rate of the moving image after editing, or moving images having a frame rate that is an integer multiple of the frame rate, or the frame rate multiplied by one over an integer, are selected as the moving images to be edited.

Therefore, it is unnecessary to perform a complicated frame rate conversion process when combining the moving images. In other words, since the frame rate of each moving image to be edited is an integer multiple of the frame rate of the moving image after editing or the frame rate of the moving image after editing multiplied by one over an integer, the frame rate can be changed by a simple process such as the process of thinning out the frames or the process of repeatedly inserting the same frame.

Therefore, even in the case of an apparatus such as a digital camera, a single moving image can be generated by combining a plurality of moving images without taking a long time or preparing resources such as a large capacity memory and a high-speed CPU.

Note that although a single set of list information is recorded to the recording medium 141 in the present embodiment, a configuration may be adopted in which a plurality of sets of list information are recorded. If this is the case, an adjustment may be made to each list during the adjustment process, and when the candidate images are displayed, information for identifying the images written in each list may be displayed. A configuration may adopted in which, at the stage of the process for manual editing, the user is prompted to select any of the lists that have been recorded.

Also, although a configuration is adopted in which moving images having a frame rate that is an integer multiple of the frame rate of the moving image after editing, or a frame rate that is the frame rate of the moving image after editing multiplied by one over an integer, are selected as moving images to be edited, a configuration may be adopted in which only moving images having a frame rate that is the same as the frame rate of the moving image after editing are selected.

Also, in the present embodiment, although a configuration is adopted in which moving images having a frame rate that is the same as the frame rate of the frame rate of the moving image after editing, a frame rate that is an integer multiple of the frame rate of the moving image after editing, or a frame rate that is the frame rate of the moving image after editing multiplied by one over an integer, are selected as moving images to be edited, a configuration may be adopted in which the moving images to be edited are selected with consideration of the number of pixels as well.

Also, regarding the adjustment process shown in FIG. 3A, although a configuration is adopted in which the frame rate is confirmed by checking the additional information stored in the moving image files in the list, a list of the frame rates of the recorded moving image files may be generated and stored in the memory 104 in advance.

Figure 3B:
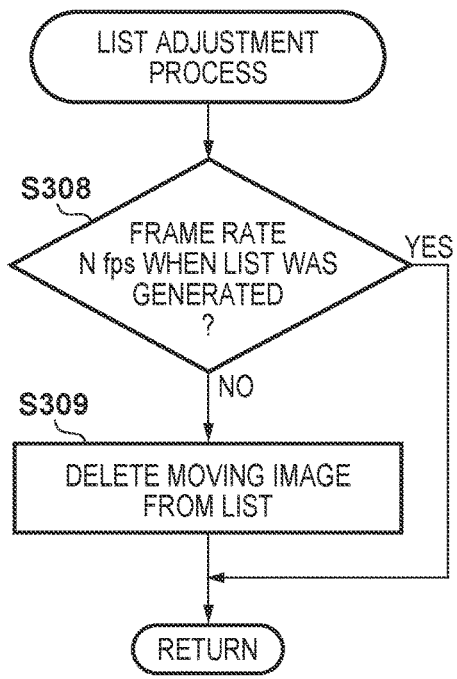

Also, the adjustment process may be performed as shown in FIG. 3B. That is, when the list information is recorded, information about the frame rate of the moving image after editing, at the time the list information was generated, is recorded together with the list information. Then, based on this information about the frame rate, it is determined whether or not the frame rate when the list was generated corresponds to the currently-set frame rate N of the moving image after editing (step S308), and in a case where the frame rate does not correspond to the frame rate N, information about all the moving image files is deleted from the list information (step S309).

Although preferred embodiments of the present invention are described above, the present invention is not limited to the embodiments above and may be variously modified or changed within the spirit thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-263351, filed Dec. 25, 2014 which is hereby incorporated by reference herein in its entirety.

What is claimed is:

1. An imaging apparatus comprising:
an imaging unit including an image sensor;
one or more processors or circuits and a memory storing instructions cause the one or more processors or circuits to perform operations of:
recording, on a recording medium, a first plurality of moving images obtained by the imaging unit;
variable setting a frame rate of a moving image to be imaged and be recorded from among a plurality of predetermined frame rates;
automatically selecting a plurality of moving images to be edited from among a plurality of moving images recorded on the recording medium;
generating a moving image having a first frame rate by combining the plurality of automatically selected moving images, wherein the first frame rate is a frame rate that has been set by the variable setting as a frame rate for the moving image to be imaged and be recorded; and
receiving input and enabling a user to specify a moving image to be edited, from among selected moving images to be edited,
wherein the automatic selection selects, as the moving images to be edited, moving images having the first frame rate and a second frame rate that is different from the first frame rate and is related to the first frame rate from among a plurality of moving images recorded on the recording medium, but does not select a moving image having a frame rate that is not related to the first frame rate as the moving images to be edited, and
wherein in the process of generating the moving image, the process of combining comprises combining the moving image specified by the user.

2. An apparatus according to claim 1, wherein the second frame rate has values that include at least an integer multiple of the first frame rate and the first frame rate multiplied by one over an integer.

3. An apparatus according to claim 2, wherein the one or more processors or circuits and the memory storing instructions cause the one or more processors or circuits to perform the operations of:
when a frame rate of one or more moving images selected to be edited is an integer multiple of the first frame rate, generating changes to the frame rate of the one or more moving images selected to be edited to the first frame rate by thinning out some frames of the one or more moving images selected to be edited, and
combining the moving images whose frame rate has been changed to the first frame rate, with another one or more moving images selected to be edited.

4. An apparatus according to claim 2, wherein the one or more processors or circuits and the memory storing instructions cause the one or more processors or circuits to perform the operations of:
when a frame rate of one or more moving images selected to be edited is the first frame rate multiplied by one over an integer, generating changes to the frame rate of the one or more moving images selected to be edited to the first frame rate by repeating some frames of the one or more moving images selected to be edited, and
combining the moving images whose frame rate has been changed to the first frame rate, with another one or more moving images selected to be edited.

5. An apparatus according to claim 1, wherein the one or more processors or circuits and the memory storing instructions cause the one or more processors or circuits to perform the operations of:
recording, to the recording medium, information about a frame rate of the moving image to be recorded.

6. An apparatus according to claim 1, wherein
the one or more processors or circuits and the memory storing instructions cause the one or more processors or circuits to perform the operations of:
selecting still image to be edited, and
generating the moving image having the first frame rate by combining moving images selected to be edited with the selected still image.

7. An apparatus according to claim 6, wherein
the one or more processors or circuits and the memory storing instructions cause the one or more processors or circuits to perform the operations of:
generating the moving image having the first frame rate by repeatedly inserting the selected still image.

8. The apparatus according to claim 1, wherein the first frame rate and the second frame rate relate to NTSC broadcasting system.

9. The apparatus according to claim 1, wherein the first frame rate and the second frame rate relate to PAL broadcasting system.

10. A method of controlling an imaging apparatus having an imaging unit, comprising:
a recording step of recording a moving image obtained by the imaging unit to a recording medium;
a setting step of setting a frame rate of a moving image to be imaged by the imaging unit and be recorded by the recording unit from among a plurality of predetermined frame rates;
a selection step of automatically selecting a plurality of moving images to be edited from among a plurality of moving images recorded on the recording medium; and
a generation step of generating a moving image having a first frame rate by combining the plurality of moving images selected by the selection unit, wherein the first frame rate is a frame rate that has been set in the setting step as a frame rate for the moving image to be imaged and be be recorded in the recording step; and
a receiving step of receiving input and enabling a user to specify a moving image to be edited, from among selected moving images to be edited,
wherein in the selection step, moving images having the first frame rate and moving images having a second frame rate that is different from the first frame rate and that is related to the first frame rate are selected, as the moving images to be edited, from among a plurality of moving images recorded on the recording medium, but a moving image having a frame rate that is not related to the first frame rate is not selected as the moving images to be edited, and
wherein in the generation step, the process of generating the moving image comprises combining the moving image specified by the user.

11. The imaging apparatus according to claim 1, wherein the one or more processors or circuits and the memory storing instructions cause the one or more processors or circuits to perform the operations of:
prompting a user to manually select at least one moving image and at least one still image to be edited, and
wherein the moving images not automatically selected to be edited are removed from a list of moving image files and still image files selected by the user.

12. The imaging apparatus according to claim 6, wherein the one or more processors or circuits and the memory storing instructions cause the one or more processors or circuits to perform the operations of:
prior to combining the selected moving images and the selected still images, determining whether at least one of the plurality of selected moving images and at least one of the selected still images to be edited fulfill at least one predetermined condition, which is selected from a group of determining a number of faces of one or more subjects, a smile intensity, an image contrast, a camera shake and a blur and also correspond to an indicated edit date range.

* * * * *